United States Patent
Chen et al.

(10) Patent No.: US 11,912,827 B2
(45) Date of Patent: Feb. 27, 2024

(54) POLY(IMIDE-ESTER-AMIDE) COPOLYMER AND OPTICAL FILM

(71) Applicant: Daxin Materials Corporation, Taichung (TW)

(72) Inventors: Guan-Ping Chen, Taichung (TW); Min-Tzu Kao, Taichung (TW)

(73) Assignee: Daxin Materials Corporation, Taichung (TW)

( * ) Notice: Subject to any disclaimer, the term of this patent is extended or adjusted under 35 U.S.C. 154(b) by 0 days.

(21) Appl. No.: 16/783,073

(22) Filed: Feb. 5, 2020

(65) Prior Publication Data

US 2021/0122881 A1 Apr. 29, 2021

(30) Foreign Application Priority Data

Oct. 29, 2019 (TW) ................. 108139100

(51) Int. Cl.
| | |
|---|---|
| C08G 73/16 | (2006.01) |
| G02B 1/14 | (2015.01) |
| C08G 69/44 | (2006.01) |
| C08J 5/18 | (2006.01) |

(52) U.S. Cl.
CPC ............ *C08G 73/16* (2013.01); *C08G 69/44* (2013.01); *C08J 5/18* (2013.01); *G02B 1/14* (2015.01); *C08J 2377/12* (2013.01); *C08J 2379/08* (2013.01)

(58) Field of Classification Search
CPC .......................... C08G 69/44; C08G 73/1017; C08G 73/1039; C08G 73/1042; C08G 73/106; C08G 73/1067; C08G 73/14; C08G 73/16; C08J 2377/12; C08J 2379/08; C08J 5/18
See application file for complete search history.

(56) References Cited

U.S. PATENT DOCUMENTS

| | | | | |
|---|---|---|---|---|
| 3,238,181 | A * | 3/1966 | Anderson | C08G 69/44 528/73 |
| 4,069,209 | A * | 1/1978 | Lange | C08G 63/6854 528/289 |
| 4,673,726 | A * | 6/1987 | Jackson, Jr. | C08G 73/16 528/288 |
| 9,975,997 | B2 | 5/2018 | Jeon et al. | |
| 2006/0269868 | A1* | 11/2006 | Hasegawa | G03F 7/0387 430/270.1 |
| 2009/0306329 | A1* | 12/2009 | Hasegawa | C08G 73/16 528/289 |
| 2012/0101224 | A1* | 4/2012 | Tsai | C08G 73/1075 524/592 |
| 2017/0165879 | A1* | 6/2017 | Miyamoto | B29C 33/60 |
| 2018/0022875 | A1 | 1/2018 | Choi et al. | |
| 2019/0315921 | A1* | 10/2019 | Saito | C08L 83/14 |
| 2021/0122881 | A1* | 4/2021 | Chen | C08G 73/14 |

FOREIGN PATENT DOCUMENTS

| | | |
|---|---|---|
| CN | 102027044 | 4/2011 |
| CN | 103571190 | 2/2014 |
| JP | S6071638 | 4/1985 |
| JP | H06345841 | 12/1994 |
| JP | H07300527 | 11/1995 |
| JP | H0823172 | * 9/1996 |
| JP | H08231721 | 9/1996 |
| JP | 2010174195 | 8/2010 |
| JP | 2012111894 | 6/2012 |
| JP | 2014180846 | 9/2014 |
| JP | 2018172669 | 11/2018 |
| JP | 2019105830 | 6/2019 |
| JP | 2020204012 | 12/2020 |
| KR | 1020180090671 | 8/2018 |
| TW | I344967 | 7/2011 |
| TW | 201217432 | 5/2012 |
| TW | 201313785 | 4/2013 |
| TW | I605091 | 11/2017 |
| TW | I623567 | 5/2018 |
| TW | 201833189 | 9/2018 |

OTHER PUBLICATIONS

Thomas Eck, Heinrich K Gruber "Thermotropic poly(ester4mide) block copolymers", Macromol. Chem. Phys. 195,3541-3565 (1994) (Year: 1994).*
Guofei Chen et al "Synthesis and properties of transparent polyimides derived from 1,4-cyclohexylene bis(trimellitate anhydride)", High Performance Polymers 2017, vol. 29(6) 627-635 (Year: 2017).*
L. H. Tagle et al "Poly(amide-imide-esters) derived from asymmetric diacids and diphenols containing silicon . . . ", Designed Monomers and Polymers, 2016 vol. 19, No. 7, 619-629 (Year: 2016).*
Masatoshi Hasegawa "Development of Solution-Processable, Optically Transparent Polyimides with Ultra-Low Linear Coefficients of Thermal Expansion", (Year: 2017).*

* cited by examiner

Primary Examiner — Frances Tischler
Assistant Examiner — Gennadiy Mesh
(74) Attorney, Agent, or Firm — JCIPRNET

(57) ABSTRACT

A poly(imide-ester-amide) copolymer and an optical film are provided. The poly(imide-ester-amide) copolymer includes imide bonds, ester bonds, and amide bonds. A molar ratio of the imide bonds, the ester bonds, and the amide bonds is 40 to 80:10 to 30:5 to 30. The imide bonds are derived from an aromatic diamine monomer and a tetracarboxylic dianhydride monomer. The amide bonds are derived from an aromatic dicarboxylic acid dichloride monomer and an aromatic diamine monomer or is derived from the aromatic dicarboxylic acid dichloride monomer and an alkoxysilane containing an amine group or an isocyanate group.

1 Claim, 1 Drawing Sheet

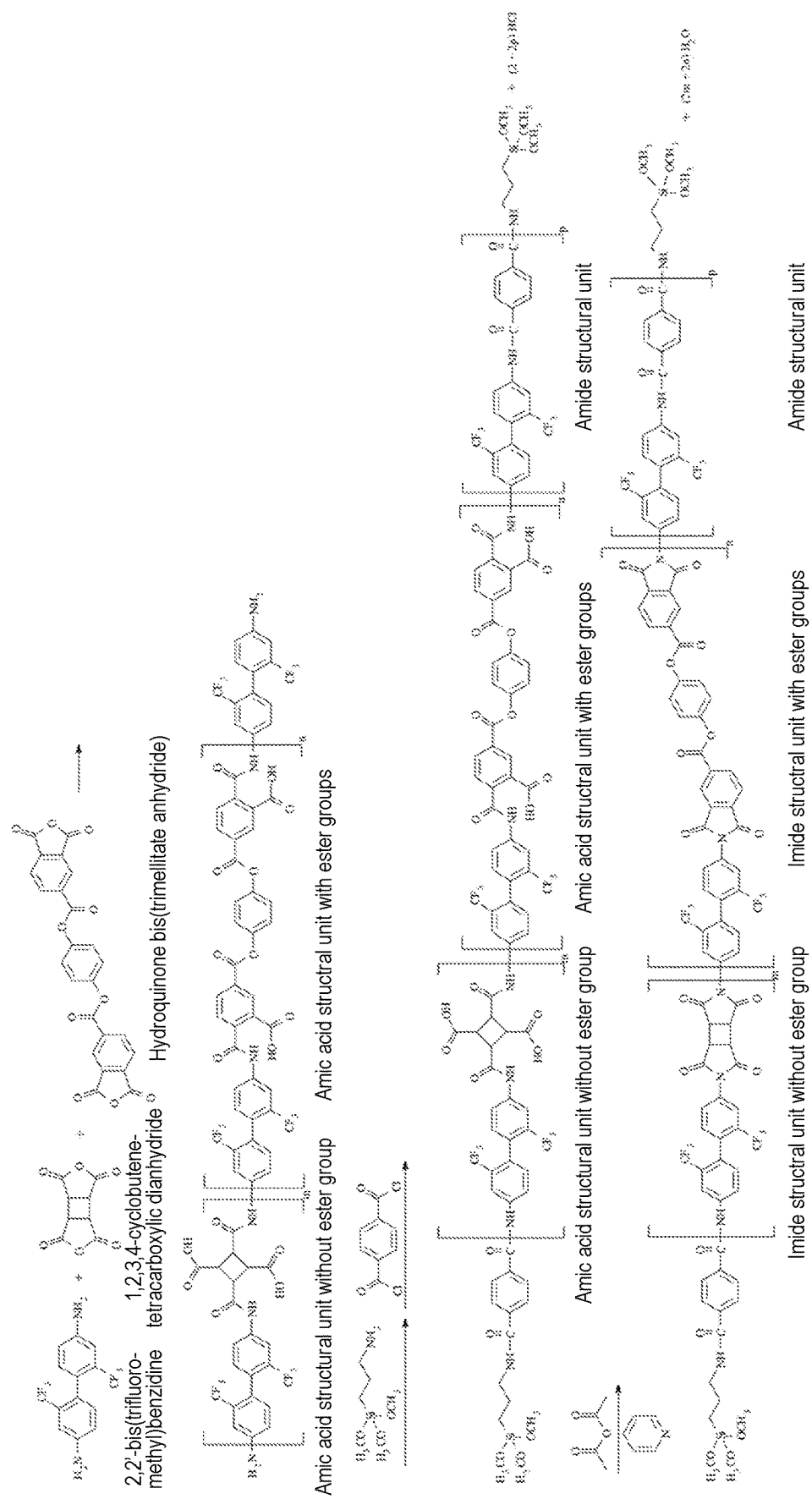

ID) COPOLYMER
POLY(IMIDE-ESTER-AMIDE) COPOLYMER AND OPTICAL FILM

CROSS-REFERENCE TO RELATED APPLICATION

This application claims the priority benefit of Taiwan application serial no. 108139100, filed on Oct. 29, 2019. The entirety of the above-mentioned patent application is hereby incorporated by reference herein and made a part of this specification.

BACKGROUND OF THE INVENTION

Field of the Invention

The invention relates to a copolymer and an optical film, and more particularly to a poly(imide-ester-amide) copolymer and an optical film.

Description of Related Art

Polyimide (PI) has excellent heat resistance, mechanical properties, and electrical properties, and thus is widely used as a molding material, an electronic material, an optical material, and the like, and is widely used in various fields. However, a thin film formed of PI has the issue of insufficient hardness. For example, a thin film formed of PI generally has a pencil hardness of less than 3B, which may cause damage to the surface of the thin film such as scratching or breakage, thereby affecting the performance of the device using the thin film. Further, in recent years, although polyamide-polyimine copolymers have been developed to form a thin film, the thin film formed of these polyamide-polyimine copolymers still has the issue of poor flexibility. Therefore, how to improve the flexibility of a thin film formed by such copolymers is an issue that those skilled in the art are currently trying to solve.

SUMMARY OF THE INVENTION

The invention provides a poly(imide-ester-amide) copolymer that may form an optical film having good flexibility, transparency, and hardness.

A poly(imide-ester-amide) copolymer of the invention includes imide bonds, ester bonds, and amide bonds. A molar ratio of the imide bonds, the ester bonds, and the amide bonds is 40 to 80:10 to 30:5 to 30.

In an embodiment of the invention, the molar ratio of the imide bonds, the ester bonds, and the amide bonds is 50 to 70:15 to 26:12 to 27.

In an embodiment of the invention, the molar ratio of the imide bonds, the ester bonds, and the amide bonds is 56 to 65:19 to 23:12 to 24.

In an embodiment of the invention, the imide bonds are derived from an aromatic diamine monomer and a tetracarboxylic dianhydride monomer. The tetracarboxylic dianhydride monomer includes at least one of a tetracarboxylic dianhydride monomer with an ester group and a tetracarboxylic dianhydride monomer without ester groups.

In an embodiment of the invention, the ester bonds are derived from a tetracarboxylic dianhydride monomer with an ester group or derived from a diamine monomer with an ester group.

In an embodiment of the invention, the tetracarboxylic dianhydride monomer with an ester group includes at least one of hydroquinone bis(trimellitate anhydride) (TAHQ), methylhydroquinone bis(trimellitate anhydride) (M-TAHQ), methoxyhydroquinone bis(trimellitate anhydride) (MeO-TAHQ), 4,4'-bis(1,3-dioxo-1,3-dihydroisobenzofuran-5-yl-carbonyloxy)biphenyl (BP-TME), 1,4-cyclohexylene bis(trimellitate anhydride) (TACH), 4,4'-(hexafluoroisopropylidene)diphenol bis(trimellitate anhydride), 4,4'-(9-fluorenylidene)diphenol bis(trimellitate anhydride) (TABPFL), and ethylene glycol bis(anhydrotrimellitate).

In an embodiment of the invention, the diamine monomer with an ester group includes at least one of 1,4-bis(4-aminobenzo-yloxy)benzene (ABHQ), 4-aminophenyl-4-aminobenzoate (APAB), bis(4-aminophenyl)terephthalate (BPTP), and bis(4-aminophenyl)-cyclohexane-1,4-dicarboxylate.

In an embodiment of the invention, the tetracarboxylic dianhydride monomer without ester groups includes at least one of 4,4'-(hexafluoroisopropylidene)diphthalic anhydride (6FDA), 1,2,3,4-cyclobutanetetracarboxylic dianhydride (CBDA), and 3,3',4,4'-biphenyltetracarboxylic dianhydride (BPDA).

In an embodiment of the invention, the amide bonds are derived from an aromatic dicarboxylic acid dichloride monomer and an aromatic diamine monomer or is derived from the aromatic dicarboxylic acid dichloride monomer and an alkoxysilane containing an amine group (—NH$_2$) or an isocyanate group (—NCO). The aromatic dicarboxylic acid dichloride monomer includes at least one of terephthaloyl chloride (TPC), isophthaloyl dichloride (IPC), 4,4'-diphenoyl chloride, or 2,2'-diphenoyl chloride.

In an embodiment of the invention, the aromatic diamine monomer includes at least one of 2,2'-bis(trifluoromethyl)benzidine (TFMB), 2,2'-bis(3-amino-4-hydroxyphenyl)hexafluoropropane (bis APAF), 4,4'-diaminodiphenylsulfone (4,4'-DDS), and 3,3'-diaminodiphenylsulfone (3,3'-DDS).

In an embodiment of the invention, the aromatic diamine monomer includes TFMB. Based on an amount of 100 mol % of the aromatic diamine monomer, an amount of the TFMB is 95 mol % or more.

An optical film of the invention includes at least one polymer. The at least one polymer includes polyimide bonds, ester bonds, and amide bonds. A molar ratio of the imide bonds, the ester bonds, and the amide bonds is 40 to 80:10 to 30:5 to 30.

In an embodiment of the invention, the at least one polymer is a poly(imide-ester-amide) copolymer or a plurality of polymers containing at least one of the imide bonds, the ester bonds, and the amide bonds. A sum of the imide bonds, the ester bonds, and the amide bonds in the plurality of polymers satisfies a molar ratio of 40 to 80:10 to 30:5 to 30.

In an embodiment of the invention, the molar ratio of the imide bonds, the ester bonds, and the amide bonds is 50 to 70:15 to 26:12 to 27.

In an embodiment of the invention, the molar ratio of the imide bonds, the ester bonds, and the amide bonds is 56 to 65:19 to 23:12 to 24.

Based on the above, the poly(imide-ester-amide) copolymer or the optical film of the invention includes imide bonds, ester bonds, and amide bonds, and a molar ratio of the imide bonds, the ester bonds, and the amide bonds is 40 to 80:10 to 30:5 to 30. Therefore, an optical film prepared by the poly(imide-ester-amide) copolymer or the plurality of polymers for which the sum of the imide bonds, the ester bonds, and the amide bonds satisfies the molar ratio of 40 to 80:10 to 30:5 to 30 has good flexibility, transparency, and hardness.

In order to make the aforementioned features and advantages of the disclosure more comprehensible, embodiments accompanied with FIGURES are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a reaction flowchart of a poly(imide-ester-amide) copolymer according to an example of the invention.

DESCRIPTION OF THE EMBODIMENTS

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

<Poly(Imide-Ester-Amide) Copolymer>

A poly(imide-ester-amide) copolymer according to the present embodiment includes imide bonds, ester bonds, and amide bonds, wherein the imide bonds, the ester bonds, and the amide bonds are randomly arranged in the main chain of the poly(imide-ester-amide) copolymer. The imide bonds are derived from an aromatic diamine monomer and a tetracarboxylic dianhydride monomer. The ester bonds are derived from a monomer with an ester group, wherein the monomer with an ester group is a tetracarboxylic dianhydride monomer with an ester group or a diamine monomer with an ester group. The amide bonds are derived from an aromatic dicarboxylic acid dichloride monomer and an aromatic diamine monomer or derived from the aromatic dicarboxylic acid dichloride monomer and an alkoxysilane with a functional group. The tetracarboxylic dianhydride monomer forming the imide bonds may be the same as or different from the tetracarboxylic dianhydride monomer with an ester group forming the ester bonds. The aromatic diamine monomer forming the imide bonds, the aromatic diamine monomer forming the amide bonds, and the diamine monomer with an ester group forming the ester bonds may be the same as or different from one another. Moreover, the molar ratio of the imide bonds, the ester bonds, and the amide bonds in the copolymer is 40 to 80:10 to 30:5 to 30, preferably 50 to 70:15 to 26:12 to 27, more preferably 56 to 65:19 to 23:12 to 24. By including the imide bonds, the ester bonds, and the amide bonds in the copolymer and making the molar ratio of each bond within the above range, an optical film formed by the poly(imide-ester-amide) copolymer has good flexibility, transparency, and hardness.

Furthermore, the poly(imide-ester-amide) copolymer is formed by polymerization, dehydration cyclization, etc. of a monomer forming imide bonds, a monomer forming ester bonds, and a monomer forming amide bonds. Next, the various monomers above are described in detail.

Monomer with an Ester Group

The monomer with an ester group provides ester bonds in the poly(imide-ester-amide) copolymer. The monomer with an ester group includes at least one of a tetracarboxylic dianhydride monomer with an ester group and a diamine monomer with an ester group.

The tetracarboxylic dianhydride monomer with an ester group includes at least one of hydroquinone bis(trimellitate anhydride) (TAHQ, CAS No. 2770-49-2), methylhydroquinone bis(trimellitate anhydride) (M-TAHQ), methoxyhydroquinone bis(trimellitate anhydride) (MeO-TAHQ), 4,4'-bis (1,3-dioxo-1,3-dihydroisobenzofuran-5-ylcarbonyloxy) biphenyl (BP-TME), 1,4-cyclohexylene bis(trimellitate anhydride) (TACH), 4,4'-(hexafluoroisopropylidene)diphenol bis(trimellitate anhydride), 4,4'-(9-fluorenylidene)diphenol bis(trimellitate anhydride) (TABPFL), and ethylene glycol bis(anhydrotrimellitate). In the present embodiment, the tetracarboxylic dianhydride monomer with an ester group includes two ester bonds. However, the invention is not limited thereto, and in other embodiments, the tetracarboxylic dianhydride monomer with an ester group may also be selected from a tetracarboxylic dianhydride monomer containing one ester bond, a tetracarboxylic dianhydride monomer containing three or more ester bonds, or other suitable tetracarboxylic dianhydride monomers.

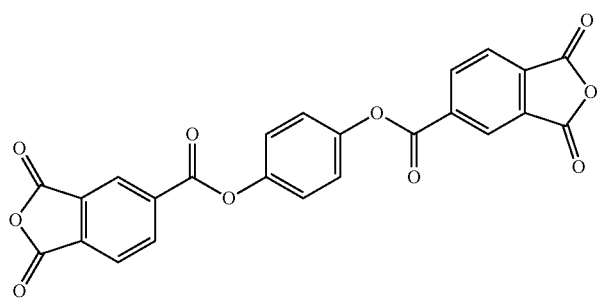 [SMILES: O=C(Oc1ccc(OC(=O)c2ccc3c(c2)C(=O)OC3=O)cc1)c1ccc2c(c1)C(=O)OC2=O]

Hydroquinone bis(trimellitate anhydride) (TAHQ)

-continued
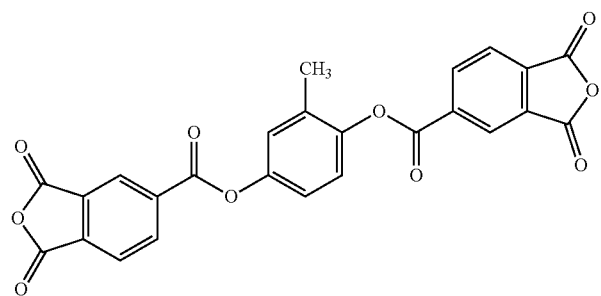 [SMILES: Cc1cc(OC(=O)c2ccc3c(c2)C(=O)OC3=O)ccc1OC(=O)c1ccc2c(c1)C(=O)OC2=O]
Methylhydroquinone bis(trimellitate anhydride) (M-TAHQ)
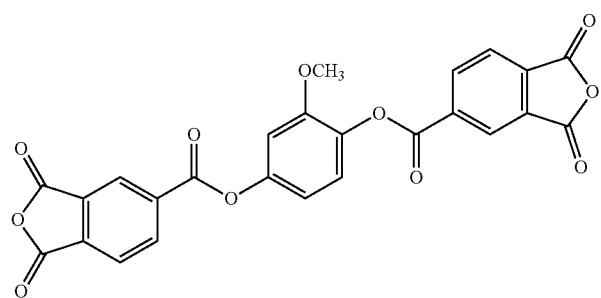 [SMILES: COc1cc(OC(=O)c2ccc3c(c2)C(=O)OC3=O)ccc1OC(=O)c1ccc2c(c1)C(=O)OC2=O]
Methoxyhydroquinone bis(trimellitate anhydride) (MeO-TAHQ)
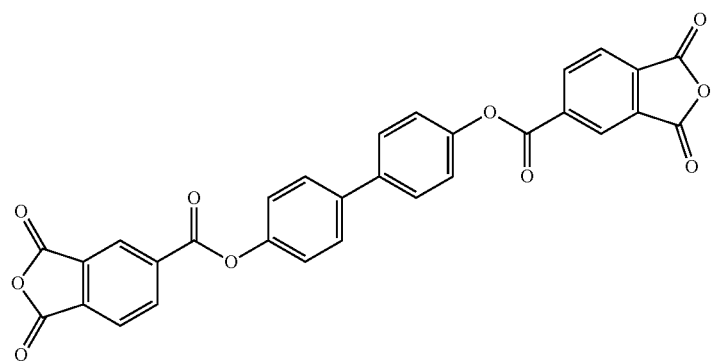 [SMILES: O=C(Oc1ccc(-c2ccc(OC(=O)c3ccc4c(c3)C(=O)OC4=O)cc2)cc1)c1ccc2c(c1)C(=O)OC2=O]
4,4'-bis(1,3-dioxo-1,3-dihydroisobenzofuran-5-ylcarbonyloxy)biphenyl (BP-TME)
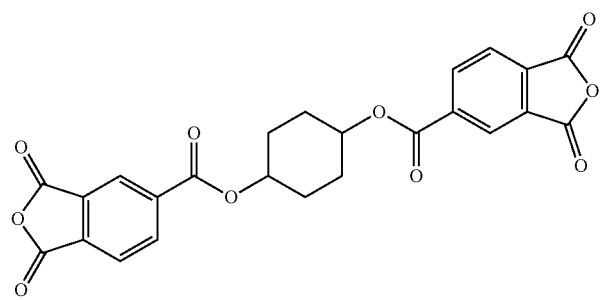 [SMILES: O=C(OC1CCC(OC(=O)c2ccc3c(c2)C(=O)OC3=O)CC1)c1ccc2c(c1)C(=O)OC2=O]
1,4-cyclohexylene bis(trimellitate anhydride) (TACH)
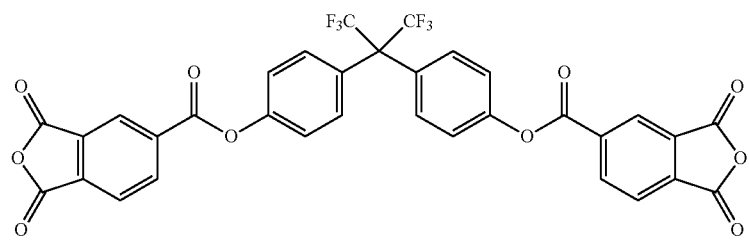 [SMILES: O=C(Oc1ccc(C(c2ccc(OC(=O)c3ccc4c(c3)C(=O)OC4=O)cc2)(C(F)(F)F)C(F)(F)F)cc1)c1ccc2c(c1)C(=O)OC2=O]
4,4'-(hexafluoroisopropylidene)diphenol bis(trimellitate anhydride)

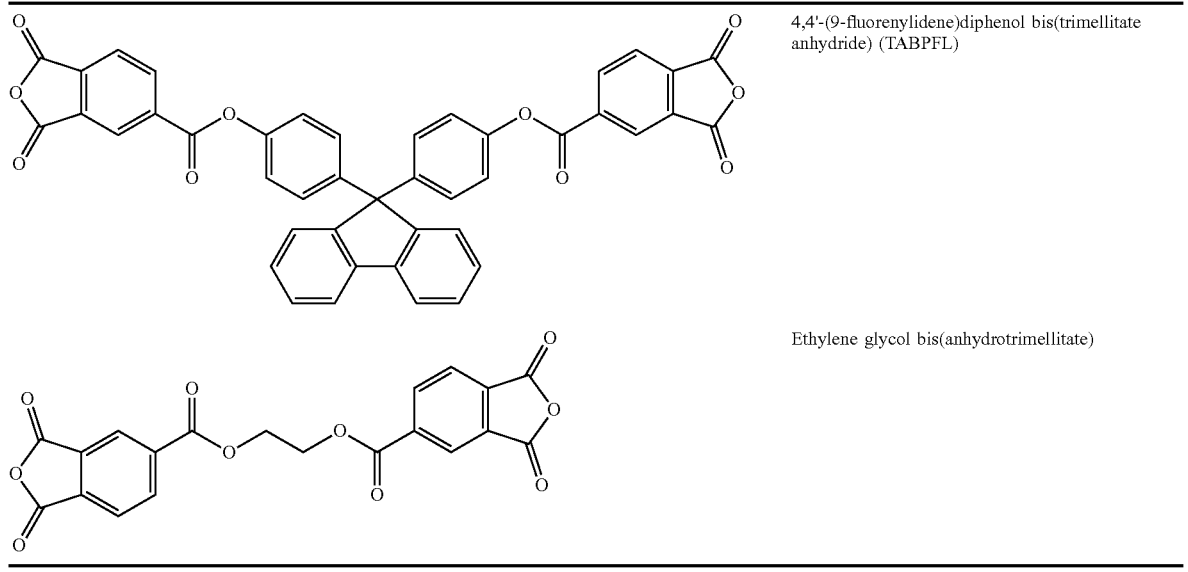

4,4'-(9-fluorenylidene)diphenol bis(trimellitate anhydride) (TABPFL)

Ethylene glycol bis(anhydrotrimellitate)

The diamine monomer with an ester group includes at least one of ABHQ (CAS No. 22095-98-3, purchased from Shifeng Technology Co., Ltd.), APAB (CAS No. 20610-77-9, purchased from Shifeng Technology Co., Ltd.), BPTP embodiments, the diamine monomer with an ester group may also be selected from a diamine monomer containing three or more ester bonds or other suitable diamine monomers.

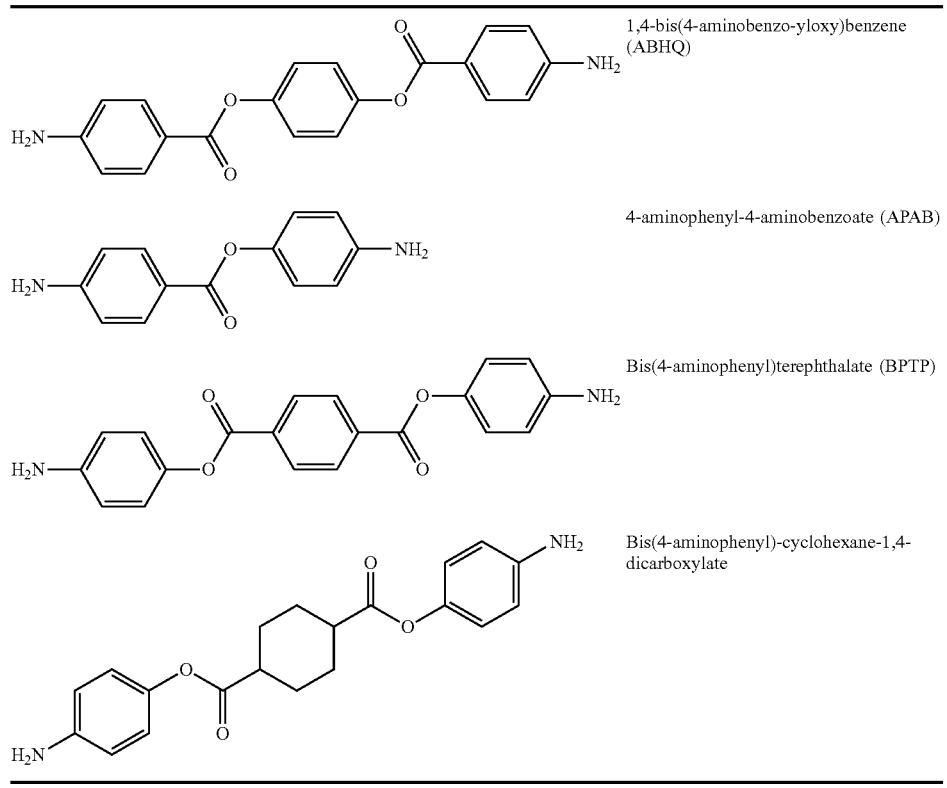

1,4-bis(4-aminobenzo-yloxy)benzene (ABHQ)

4-aminophenyl-4-aminobenzoate (APAB)

Bis(4-aminophenyl)terephthalate (BPTP)

Bis(4-aminophenyl)-cyclohexane-1,4-dicarboxylate (CAS No. 16926-73-1, purchased from Shifeng Technology Co., Ltd.), and bis(4-aminophenyl)-cyclohexane-1,4-dicarboxylate. In the present embodiment, the diamine monomer with an ester group includes one or two ester bonds. However, the invention is not limited thereto, and in other Tetracarboxylic Dianhydride Monomer The tetracarboxylic dianhydride monomer reacts with the aromatic diamine monomer to form imide bonds. The tetracarboxylic dianhydride monomer includes at least one of a tetracarboxylic dianhydride monomer with an ester group and a tetracarboxylic dianhydride monomer without ester groups. The tetracarboxylic dianhydride monomer with an ester group in the tetracarboxylic dianhydride monomer may be the same as the tetracarboxylic dianhydride monomer with an ester group in the monomer with an ester group and is not repeated herein. The tetracarboxylic dianhydride monomer forming the imide bonds may be the same as or different from the tetracarboxylic dianhydride monomer with an ester group forming the ester bonds.

The tetracarboxylic dianhydride monomer without ester groups includes at least one of 6FDA, CBDA, and BPDA. However, the invention is not limited thereto, and in other embodiments, the tetracarboxylic dianhydride monomer without ester groups may also be selected from other suitable tetracarboxylic dianhydride monomers.

Aromatic Diamine Monomer

The aromatic diamine monomer is reacted with the tetracarboxylic dianhydride monomer to form imide bonds. The aromatic diamine monomer is reacted with the aromatic dicarboxylic acid dichloride monomer to form amide bonds.

The aromatic diamine monomer includes TFMB. Based on an amount of 100 mol % of the aromatic diamine monomer, an amount of the TFMB is 95 mol % or more, preferably 97.5 mol % or more, and more preferably 100 mol %. When the amount of the TFMB is within the above range, the poly(amide-imide) copolymer may have good viscosity such that good coating uniformity may be achieved when the poly(amide-imide) copolymer is formed into an optical film to facilitate film forming.

In other embodiments, the aromatic diamine monomer may further include other aromatic diamine monomers. The other aromatic diamine monomers include at least one of bis APAF, 4,4'-DDS, and (3,3'-DDS). However, the invention is not limited thereto, and in other embodiments, other aromatic diamine monomers may also be selected from other suitable diamine monomers.

Aromatic Dicarboxylic Acid Dichloride Monomer

The aromatic dicarboxylic acid dichloride monomer is reacted with the aromatic diamine monomer or the alkoxysilane with a functional group to form amide bonds. The aromatic dicarboxylic acid dichloride monomer includes at least one of terephthaloyl chloride (TPC), isophthaloyl dichloride (IPC), 4,4'-diphenoyl chloride, and 2,2'-diphenoyl chloride. However, the invention is not limited thereto, and in other embodiments, the aromatic dicarboxylic acid dichloride monomer may also be selected from other suitable aromatic dicarboxylic acid dichloride monomers.

Alkoxysilane with a Functional Group

The alkoxysilane with a functional group is reacted with the aromatic dicarboxylic acid dichloride monomer to form amide bonds. The alkoxysilane with a functional group includes at least one of an alkoxysilane with an amine group and an alkoxysilane with an isocyanate group. For example, an alkoxysilane with an amine group and an alkoxysilane with an isocyanate group may be reacted with an acyl chloride group derived from an aromatic dicarboxylic acid dichloride monomer located at the poly(imide-ester-amide) copolymer terminal respectively via the amine group and the isocyanate group separately, so as to be bonded to the terminal of the poly(imide-ester-amide) copolymer to form a silane terminal structure. The alkoxysilane with a functional group may be used as a blocking agent in the reaction of the poly(imide-ester-amide) copolymer.

The alkoxysilane containing an amine group includes at least one of (3-aminopropyl)triethoxysilane (APTES) and (3-aminopropyl)trimethoxysilane (APTMS). However, the invention is not limited thereto, and in other embodiments, the alkoxysilane containing an amine group may also be selected from other suitable monomers.

The alkoxysilane containing an isocyanate group includes at least one of 3-isocyanatopropyltriethoxysilane and 3-isocyanatopropyltrimethoxysilane. However, the invention is not limited thereto, and in other embodiments, the alkoxysilane containing an isocyanate group may also be selected from other suitable monomers.

<Preparation of Poly(Imide-Ester-Amide) Copolymer>

The aromatic diamine monomer and the tetracarboxylic dianhydride monomer were first polymerized to form a polyamic acid, wherein at least one of the aromatic diamine monomer and the tetracarboxylic dianhydride monomer contained an ester group. Next, an aromatic dicarboxylic acid dichloride monomer was added, and an alkoxysilane with a functional group was optionally added to form a poly(amic acid-ester-amide) copolymer. Then, an amic acid structural unit in the poly(amic acid-ester-amide) copolymer was subjected to a dehydration cyclization reaction to form a poly(imide-ester-amide) copolymer. The poly(imide-ester-amide) copolymer included imide bonds, ester bonds, and amide bonds, wherein the amide bonds were derived from an aromatic dicarboxylic acid dichloride monomer and an aromatic diamine monomer.

The polymerization reaction and the dehydration cyclization reaction may be performed in the presence of a solvent. The solvent is, for example, N-methylpyrrolidone, but the invention is not limited thereto, and other solvents may be selected as needed.

The temperature of the polymerization reaction may be 5° C. to 40° C. and the time may be 4 hours to 12 hours.

The dehydration cyclization reaction may be performed using a high-temperature cyclization method or a chemical cyclization method.

The temperature of the high-temperature cyclization method may be 150° C. to 180° C. and the time may be 4 hours to 8 hours.

In the chemical cyclization method, a dehydrating agent and a catalyst may be added to the reaction solution and reacted at a temperature of 70° C. to 100° C. for 2 hours to 5 hours. The dehydrating agent is, for example, an acid anhydride such as acetic anhydride, propionic anhydride, or trifluoroacetic anhydride, but the invention is not limited thereto, and other dehydrating agents may be selected as needed. The catalyst is, for example, a tertiary amine such as triethylamine, pyridine, or dimethylpyridine, but the invention is not limited thereto, and other catalysts may be selected as needed.

For example, the reaction process in which chemical cyclization was adopted and TFMB was used as the aromatic diamine monomer, TPC was used as the dicarboxylic acid dichloride monomer, CBDA was used as the tetracarboxylic dianhydride monomer without ester groups, TAHQ was used as the tetracarboxylic dianhydride monomer with an ester group, and APTMS was used as the alkoxysilane with a functional group for the reaction to form the poly(imide-ester-amide) copolymer is as provided in FIG. 1.

In the reaction process shown in FIG. 1, TFMB, CBDA, and TAHQ were polymerized to form a copolymer including an amic acid structural unit with an ester group and an amic acid structural unit without ester groups, wherein the quantity "m" of the amic acid structural unit without ester groups and the quantity "n" of the amic acid structural unit with an ester group were respectively 1 or more and were changed with the addition of the monomer. Next, reaction with APTMS and TPC was performed to form a poly(amic acid-ester-amide) copolymer including an amic acid structural unit with an ester group, an amic acid structural unit without ester groups, and an amide structural unit and having a silane terminal structure, wherein the quantity "p" of the amide structural unit was 1 or more and was changed with the amount of the monomer. Lastly, the poly(amic acid-ester-amide) copolymer was subjected to a dehydration cyclization reaction in the presence of acetic anhydride and pyridine to form a poly(imide-ester-amide) copolymer having a silane terminal. It is to be noted that, in the present embodiment, the poly(imide-ester-amide) copolymer included a block formed of m imide structural units without ester groups, a block formed of n imide structural units with an ester group, and a block formed of p amide structural units, but the invention is not limited thereto, and the structural unit may also be randomly arranged in the poly(imide-ester-amide) copolymer.

Calculation of Molar Ratio of Imide Bonds, Ester Bonds, and Amide Bonds

The molar ratio of the imide bonds, the ester bonds, and the amide bonds in the poly(imide-ester-amide) copolymer was calculated from the amount of the monomer forming the imide bonds, the amount of the monomer forming the ester bonds, and the amount of the monomer forming the amide bonds. In detail, the molar ratio of the imide bonds, the ester bonds, and the amide bonds may be calculated by the following equation 1 to equation 3:

$$\text{mole number of imide bonds} = \text{mole number of tetracarboxylic dianhydride} \times 2 \quad \text{Equation 1:}$$

$$\text{mole number of ester bonds} = \Sigma(\text{mole number of monomer containing n ester groups} \times n) \quad \text{Equation 2:}$$

$$\text{mole number of amide bonds} = \text{mole number of aromatic dicarboxylic acid dichloride monomer} \times 2 \quad \text{Equation 3:}$$

<Optical Film>

The optical film was formed of at least one polymer. The at least one polymer included polyimide bonds, ester bonds, and amide bonds. The molar ratio of the imide bonds, the ester bonds, and the amide bonds was 40 to 80:10 to 30:5 to 30, preferably 50 to 70:15 to 26:12 to 27, more preferably 56 to 65:19 to 23:12 to 24. The at least one polymer may be the poly(imide-ester-amide) copolymer or the plurality of polymers containing at least one of the imide bonds, the ester bonds, and the amide bonds. The sum of the imide bonds, the ester bonds, and the amide bonds in the plurality of polymers satisfied the molar ratio of 40 to 80:10 to 30:5 to 30, preferably 50 to 70:15 to 26:12 to 27, more preferably 56 to 65:19 to 23:12 to 24. Thereby, the at least one polymer may form an optical film having good flexibility, transparency, and hardness.

When the optical film is formed of a plurality of polymers containing at least one of imide bonds, ester bonds, and amide bonds, for example, when the optical film is formed of a first polymer and a second polymer, the first polymer may contain imide bonds and the second polymer may contain ester bonds and amide bonds; and the molar ratio of the imide bonds contained in the first polymer, the ester bonds contained in the second polymer, and the amide bonds contained in the second polymer is within the above range. In another embodiment, the first polymer may contain imide bonds and ester bonds and the second polymer may contain imide bonds and amide bonds; the sum of the imide bonds contained in the first polymer and the imide bonds contained in the second polymer and the molar ratio of the ester bonds contained in the first polymer and the amide bonds contained in the second polymer are within the above ranges.

When the optical film is formed of the plurality of polymers, the molar ratio of the sum of the imide bonds, the ester bonds, and the amide bonds in the plurality of polymers may be calculated in the same manner as the molar ratio of the imide bonds, the ester bonds, and the amide bonds in the poly(imide-ester-amide) copolymer and is calculated from the amount of the monomer in each polymer and is not further described herein.

The optical film is prepared, for example, by coating the poly(imide-ester-amide) copolymer or the plurality of mixed polymers containing at least one of the imide bonds, the ester bonds, and the amide bonds on a substrate and then drying.

The substrate is not particularly limited and may be selected as needed. The substrate is, for example, alkali-free glass, soda lime glass, hard glass, or quartz glass.

The method of coating is not particularly limited and may be selected as needed. The coating method is, for example, a flow method, a roll coating method, a bar coating method, a spray coating method, an air knife coating method, a spin coating method, a flow coating method, a curtain coating method, or a dipping method.

The method of drying is not particularly limited and may be selected as needed. The drying method is, for example, heating a substrate on which a poly(imide-ester-amide) copolymer or a plurality of polymers containing at least one of imide bonds, ester bonds, and amide bonds is coated using an oven or a hot plate to remove the solvent. The temperature of drying may be 200° C. to 300° C. and the time may be 20 minutes to 1 hour. Baking may also be performed by gradient heating as needed.

In an embodiment, the bend recovery angle is greater than 85 degrees, preferably greater than or equal to 90 degrees. Further, according to the American Society for Testing Materials (ASTM) D1003, an optical film having a thickness of 70 μm to 80 μm has a haze of less than 1%, preferably less than 0.7%. In addition, according to ASTM E313, an optical film having a thickness of 70 μm to 80 μm has a transmittance of greater than 85% at a wavelength of 550 nm, preferably greater than 88%, and a yellowness index (YI) of 5 or less, preferably 3 or less. Further, the optical film having a thickness of 70 μm to 80 μm has a pencil hardness of greater than 3B, preferably greater than F.

Examples are provided below to more specifically describe the invention. Although the following experiments are described, the materials used and the amount and ratio of each thereof, as well as treatment details and treatment procedures . . . etc., may be suitably modified without exceeding the scope of the invention. Accordingly, restrictive interpretation should not be made to the invention based on the experiments described below.

The preparation of a monomer with an ester group is described below with the preparation of TACH as an example.

21.6 g of 1,4-cyclohexanediol was dissolved in a mixed solution of 50.5 g THF and 36.8 g pyridine. Moreover, 86.3 g of TMAC was dissolved in 200 g of THF to form a TMAC solution. Next, the mixed solution containing 1,4-cyclohexanediol was slowly dripped into the TMAC solution at 0° C. using an ice bath and stirred for 1 hour. Then, the ice bath was removed and stirring was performed continuously for 12 hours at room temperature. Next, suction filtration was performed using pure water to remove pyridine/hydrochloride salts to obtain a white solid. Subsequently, the white solid was baked at 150° C. for 12 hours to obtain about 86 g of a TACH solid.

Other tetracarboxylic dianhydride monomers with an ester group may be prepared by changing the diol used in the synthesis step. Further, a diamine monomer with an ester group bis(4-aminophenyl)-cyclohexane-1,4-dicarboxylate may be prepared by changing the TMAC used in the synthesis step to 4-aminobenzoyl chloride.

In the following, synthesis examples 1 to 11 of the polymer are described.

cooled to room temperature and precipitated with 5 L of ethanol. The precipitated solid was dried at 60° C. for 12 hours to obtain 49.5 g of a poly(imide-ester-amide) copolymer in solid form.

[Synthesis Examples 2 to 11]

The preparation methods of Synthesis examples 2 to 11 were the same as that of Synthesis example 1, except that the amount of each component and the type thereof were changed. The composition of each Synthesis example and the amount thereof, and the molar ratio of the imide bonds, the ester bonds, and the amide bond in the polymer are shown in Table 1.

TABLE 1

(unit: parts by mole)

| Polymer | Synthesis Example | Aromatic diamine monomer | Alkoxysilane with a functional group | | Monomer with an ester group | | Tetracarboxylic dianhydribe monomer | | | Aromatic discarboxylic acid dichloride monomer | | Monomer containing hydroxyl groups | Molar ratio of imide bonds, ester bonds, and amide bonds |
|---|---|---|---|---|---|---|---|---|---|---|---|---|---|
| | | TFMB | APTES | Alink25 | TAHQ | TACH | CBDA | 6FDA | BPDA | TPC | IPC | BPEF | |
| PEsIA | 1 | 97.5 | 5 | 0 | 25 | 0 | 20 | 25 | 0 | 30 | 0 | 0 | 56:20:24 |
| | 2 | 100 | 0 | 0 | 30 | 0 | 20 | 35 | 0 | 15 | 0 | 0 | 65:23:12 |
| | 3 | 97.5 | 5 | 0 | 0 | 25 | 22.5 | 25 | 0 | 27.5 | 0 | 0 | 58:20:22 |
| | 4 | 100 | 0 | 0 | 15 | 0 | 0 | 0 | 17 | 59.5 | 8.5 | 0 | 28:13:59 |
| | 5 | 97.5 | 5 | 0 | 20 | 0 | 20 | 20 | 0 | 40 | 0 | 0 | 50:17:33 |
| PI | 6 | 100 | 0 | 0 | 0 | 0 | 40 | 50 | 10 | 0 | 0 | 0 | 100:0:0 |
| PEsI | 7 | 100 | 0 | 0 | 25 | 0 | 15 | 50 | 10 | 0 | 0 | 0 | 80:20:0 |
| PAI | 8 | 100 | 0 | 0 | 0 | 0 | 20 | 15 | 5 | 60 | 0 | 0 | 40:0:60 |
| | 9 | 97.5 | 5 | 0 | 0 | 0 | 35 | 26.25 | 8.75 | 30 | 0 | 0 | 70:0:30 |
| PI | 10 | 95 | 5 | 0 | 0 | 0 | 40 | 50 | 10 | 0 | 0 | 0 | 100:0:0 |
| PEsA | 11 | 20 | 0 | 20 | 0 | 0 | 0 | 0 | 0 | 100 | 0 | 70 | 0:70:30 |

In Table 1, the abbreviations are as follows:
PEsIA: poly(imide-ester-amide) copolymer
PI: polyimide
PEsI: poly(ester-imide) copolymer
PAI: poly(amide-imide) copolymer
PEsA: poly(ester-amide) copolymer
TFMB: 2,2'-bis(trifluoromethyl)benzidine
APTES: (3-aminopropyl)triethoxysilane
Alink25: 3-isocyanatopropyltriethoxysilane
TAHQ: hydroquinone bis(trimellitate anhydride)
TACH: 1,4-cyclohexylene bis(trimellitate anhydride)
CBDA: 1,2,3,4-cyclobutane tetracarboxylic dianhydride
6FDA: 4,4'-(hexafluoroisopropylidene)diphthalic anhydride
BPDA: 3,3',4,4'-biphenyltetracarboxylic dianhydride
TPC: terephthaloyl chloride
IPC: isophthaloyl dichloride
BPEF: bisphenoxy ethanol fluorene

[Synthesis Example 1]

271 g of N-methyl-2-pyrrolidone (NMP) was added to a 1 L reactor provided with a stirrer, a nitrogen injection device, a drip funnel, a temperature regulator, and a condenser when nitrogen gas was introduced into the reactor. Next, after the temperature of the reactor was set to 25° C., 26.46 g (0.083 mol) of TFMB was dissolved in NMP and the resulting solution was maintained at 25° C. Then, 9.71 g (0.021 mol) of TAHQ, 3.32 g (0.017 mol) of CBDA, and 9.41 g (0.021 mol) of 6FDA were added and stirred for 2 hours to 4 hours to dissolve and react. Next, the temperature of the solution was maintained at 0° C. to 5° C., after which 0.94 g (0.004 mol) of APTES was added, and the mixture was evenly stirred. Thereafter, 5.16 g (0.025 mol) of TPC was added and reacted at 25° C. for 12 hours to obtain a solution of a poly(imide-ester-amide) copolymer having a solid content of 11 wt %.

Next, 11.72 g of pyridine and 15.42 g of acetic anhydride (Ac$_2$O) were added to the solution of the poly(imide-ester-amide) copolymer. After stirring evenly, the mixture was stirred at 85° C. for 4 hours. Next, the reaction solution was Next, Examples and Comparative examples in which an optical film was formed using the poly(imide-ester-amide) copolymer or other polymers are described.

[Example 1]

10 g of a poly(imide-ester-amide) copolymer in solid form was dissolved in 56.66 g of dimethylacetamide (DMAc), thereby obtaining a 15 wt % solution. Then, the obtained solution was applied on a glass substrate, and the wet film thickness was 540 µm. Next, drying was first performed at 120° C. for 1 hour, and then at 230° C. for 20 minutes, and then slow cooling was performed. Then, the obtained film was separated from the glass substrate, thereby obtaining an optical film prepared by a poly(amide-imide) copolymer having a thickness of 80 µm.

[Examples 2 to 4 and Comparative Examples 1 to 6]

The preparation methods of Examples 2 to 4 and Comparative examples 1 to 6 were the same as that of Example 1 except that the amount of each component and the type thereof were changed. The composition of each of the examples and the amount thereof are shown in Table 2.

Further, the evaluation results of the physical properties of the optical film obtained in each Example and Comparative example are also shown in Table 2.

<Measurement of Physical Properties>

1. Bend Recovery Angle

Two 80 μm optical films were respectively prepared for each of the Examples and Comparative examples, wherein one optical film was subjected to an inward bending test (R angle of 3 mm), and the other optical film was subjected to an outward bending test (R angle of 3 mm), and the optical films were kept in an environment of high temperature and high humidity (temperature of 60° C., humidity of 90%) for 120 hours and then removed. Subsequently, the bend recovery angle after the removal of the optical film in the inward bending test and the bend recovery angle after the removal of the optical film in the outward bending test were measured, and the average value was taken. When the value was greater than 85 degrees, the optical film had improved hygroscopicity and good flexibility. For the measurement method, a commercially available angle measuring machine such as a contact angle measuring instrument (model number DSA100) manufactured by KRÜSS may be used.

2. Haze

The haze of the 80 μm optical film prepared in each of the Examples and Comparative examples was measured in accordance with the specifications of ASTM D1003 using a haze meter (manufactured by Nippon Denshoku Industries Co., Ltd., model number NDH5000). When the haze was less than 1%, the display optical film had good transparency.

3. Pencil Hardness

The pencil hardness of the 80 μm optical film prepared in each of the Examples and Comparative examples was measured in accordance with the specification of ASTM D3363 at a load of 765 g. When the pencil hardness was greater than 3B, the optical film had good hardness.

4. Transmittance and Yellowness Index

The transmittance and the yellowness index (YI) at a wavelength of 550 nm of the 80 μm optical film prepared in each of the Examples and Comparative examples were measured in accordance with the specifications of ASTM E313. When the transmittance was greater than 85%, the display optical film had good light transmittance. When the yellowness index (YI) was 5 or less, the optical film had good yellowing resistance.

According to Table 2, when the molar ratio of the imide bonds, the ester bonds, and the amide bonds in the poly (imide-ester-amide) copolymer was within the range of 40 to 80:10 to 30:5 to 30 (Examples 1 to 3), the optical films prepared from the poly(imide-ester-amide) copolymer had a bend recovery angle of greater than 85 degrees, a haze of less than 1%, a pencil hardness of greater than 3B, a transmittance of greater than 85%, and a yellowness index of 5 or less. In contrast, the optical films prepared from the poly(imide-ester-amide) copolymer having a molar ratio of the imide bonds, the ester bonds, and the amide bonds outside the above range (Comparative examples 3 to 4) had a bend recovery angle of 85 degrees or less, a haze of 1% or more, a transmittance of 85% or less, or a yellowness index of greater than 5. Therefore, when the poly(imide-ester-amide) copolymer contained the imide bonds, the ester bonds, and the amide bonds having a molar ratio within the above range, the optical films prepared by the poly(imide-ester-amide) copolymer had good flexibility, transparency, hardness, light transmittance, and yellowing resistance, and the optical films prepared by the poly(imide-ester-amide) copolymer for which the molar ratio of the imide bonds, the ester bonds, and the amide bonds was not within the above range may not simultaneously satisfy the requirements of flexibility, transparency, hardness, light transmittance, and yellowing resistance.

Further, the optical films prepared from PEsIA (Examples 1 to 3) had a bend recovery angle of greater than 85 degrees, a haze of less than 1%, a pencil hardness of greater than 3B, a transmittance of greater than 85%, and a yellowness index of 5 or less. In contrast, the optical films prepared from PAI, PI, or PEsI (Comparative examples 1 to 2 and 5 to 6 respectively) had a bend recovery angle of 85 degrees or less or a pencil hardness of 3B or less. Therefore, the optical films prepared from PEsIA had good flexibility, transparency, hardness, light transmittance, and yellowing resistance, and the optical films prepared by PAI, PI, or PEsI may not simultaneously satisfy the requirements of flexibility, transparency, hardness, light transmittance, and yellowing resistance.

Compared to the optical films prepared by PEsIA with ester bonds (Examples 1 to 3), the optical films prepared by PAI without ester bonds (Comparative examples 1 and 2) had a bend recovery angle of 85 degrees or less. Therefore,

TABLE 2

|  | Synthesis example | Polymer | Molar ratio of polyimide bonds, ester bonds, and polyamide bonds | Transmittance (%) | YI | Haze (%) | Bend recovery angle (degrees) | Pencil hardness |
|---|---|---|---|---|---|---|---|---|
| Example 1 | 1 | PEsIA | 56:20:24 | 89.12 | 3.34 | 0.53 | 92.4 | H |
| Example 2 | 2 | PEsIA | 65:23:12 | 89.56 | 3.16 | 0.48 | 100.7 | H |
| Example 3 | 3 | PEsIA | 58:20:22 | 89.64 | 2.73 | 0.52 | 90.5 | B |
| Example 4 | 10 and 11 | PI and PEsA | 65:20:15 | 89.65 | 3.37 | 0.48 | 112.1 | 2B |
| Comparative example 1 | 8 | PAI | 40:0:60 | 88.57 | 3.94 | 0.52 | 68.2 | H |
| Comparative example 2 | 9 | PAI | 70:0:30 | 88.96 | 3.21 | 0.63 | 76.1 | H |
| Comparative example 3 | 5 | PEsIA | 50:17:33 | 88.90 | 6.47 | 1.16 | 78.5 | H |
| Comparative example 4 | 4 | PEsIA | 28:13:59 | 0.35 | 42.74 | 99.51 | 58.0 | —* |
| Comparative example 5 | 6 | PI | 100:0:0 | 89.54 | 2.89 | 0.48 | 93.9 | <6B |
| Comparative example 6 | 7 | PEsI | 80:20:0 | 89.85 | 2.50 | 0.46 | 109.0 | <6B |

*The haze of the optical film was not up to standard (for example, the haze is 2% or more), so the pencil hardness was not measured.

by containing ester bonds in the polymer, the hygroscopicity of the polymer may be reduced, and the bend recovery angle of the resulting optical film may be increased to improve the flexibility of the optical film.

Compared to the optical films prepared by PEsIA (Examples 1 to 3), the optical films prepared by PI or PEsI without amide bonds (Comparative examples 5 and 6 respectively) had a pencil hardness of 3B or less. Therefore, by including the amide bonds in the polymer, the pencil hardness of the resulting optical film may be increased to improve the hardness of the optical film.

Compared to the optical films prepared from a poly(imide-ester-amide) copolymer containing the imide bonds, the ester bonds, and the amide bonds having a molar ratio within the above range (Examples 1 to 3), the optical films prepared from a poly(imide-ester-amide) copolymer containing the amide bonds having a molar ratio exceeding the above range (Comparative examples 3 and 4) had a bend recovery angle of 85 degrees or less, a haze of 1% or more, and a yellowness index of greater than 5. Therefore, even if the copolymer contained ester bonds, when the amide bonds contained in the copolymer exceeded the above range, the hygroscopicity of the polymer was still increased, such that the resulting optical film had reduced bend recovery angle, increased haze, and increased yellowness index that are not conducive to improving flexibility, transparency, and yellowing resistance. Further, when the sum of the amide bonds and the ester bonds contained in the polymer was excessive (Comparative example 4), the haze of the resulting optical film was significantly increased, which was disadvantageous for improving transparency.

Moreover, when the optical film was prepared by mixing PI and PEsA and the ratio of the sum of the molar ratio of the imide bonds, the ester bonds, and the amide bonds respectively included in the PI and PEsA was 40 to 80:10 to 30:5 to 30 (Example 4), the optical films prepared from the plurality of polymers had a bend recovery angle of greater than 90 degrees, a haze of less than 1%, a pencil hardness of greater than 3B, a transmittance of greater than 85%, and a yellowness index of 5 or less. That is, when the optical film was formed of a plurality of polymers containing at least one of imide bonds, ester bonds, and amide bonds, and the molar ratio of the sum of the imide bonds, the ester bonds, and the amide bonds in the plurality of polymers was within the above range, the resulting optical film may have good flexibility, transparency, hardness, light transmittance, and yellowing resistance.

Based on the above, the invention provides a poly(imide-ester-amide) copolymer including imide bonds, ester bonds, and amide bonds, wherein the molar ratio of the imide bonds, the ester bonds, and the amide bonds is 40 to 80:10 to 30:5 to 30. Further, the optical film may be formed of a poly(imide-ester-amide) copolymer or a plurality of polymers containing at least one of imide bonds, ester bonds, and amide bonds, and the molar ratio of the sum of the imide bonds, the ester bonds, and the amide bonds of the plurality of polymers is within the above range. Therefore, an optical film prepared from the poly(imide-ester-amide) copolymer or the plurality of polymers containing at least one of the imide bonds, the ester bonds, and the amide bonds has good flexibility, transparency, hardness, light transmission, and yellowing resistance.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:
1. A poly(imide-ester-amide) copolymer, comprising imide bonds from 2,2'-bis(trifluoromethyl)benzidine (TFMB) and at least one of 1,2,3,4-cyclobutane tetracarboxylic dianhydride (CBDA), 4,4'-(hexafluoroisopropylidene) diphthalic anhydride (6FDA) or 3,3',4,4'-biphenyltetracarboxylic dianhydride (BPDA), ester bonds from one of hydroquinone bis(trimellitate anhydride) (TAHQ) or 1,4-cyclohexylene bis(trimellitate anhydride) (TACH), and amide bonds from 2,2'-bis(trifluoromethyl)benzidine (TFMB) and at least one of terephthaloyl chloride (TPC) or isophthaloyl dichloride (IPC), and one of (3-aminopropyl) triethoxysilane (APTES) or 3-isocyanatopropyltriethoxysilane (Alink25), and a molar ratio of the imide bonds, the ester bonds, and the amide bonds is 56 to 65:19 to 23:12 to 24,
wherein the imide bonds, the ester bonds, and the amide bonds are randomly arranged in a main chain of the poly(imide-ester-amide) copolymer, and
an optical film prepared from the poly(imide-ester-amide) copolymer after a baking process at 200° C. to 300° C. for 20 minutes to 1 hour and having a thickness of 80 μm has a bend recovery angle of greater than 85 degrees, a haze of less than 1%, a pencil hardness of greater than 3B, a transmittance of greater than 85% and a yellowness index of 5 or less.

* * * * *